W. H. DEWEES.
BANK CHECK OR DRAFT.
APPLICATION FILED APR. 4, 1914.

1,137,707.

Patented Apr. 27, 1915.

UNITED STATES PATENT OFFICE.

WILLIAM H. DEWEES, OF BLOOMINGTON, ILLINOIS.

BANK CHECK OR DRAFT.

1,137,707.      Specification of Letters Patent.      Patented Apr. 27, 1915.

Application filed April 4, 1914. Serial No. 829,444.

*To all whom it may concern:*

Be it known that I, WILLIAM H. DEWEES, a citizen of the United States, residing at Bloomington, in the county of McLean and State of Illinois, have invented certain new and useful Improvements in Bank Checks or Drafts, of which the following is a specification.

This invention relates to an improved form or structure of bank check or draft, and has for its main object to largely do away with the necessity of using the value-limiting stamps commonly employed to prevent the fraudulent raising of a check or draft.

The invention, its mode of use, and the manner in which it accomplishes the stated purpose will all be readily understood from the following description, taken in connection with the accompanying drawing, in which the figure is a plan or face view of a bank check embodying the invention in approved form.

Referring to the drawing, 5 designates the intermediate or body portion of the check, which may take any of the usual or customary forms of bank checks or drafts. At each end of the body portion is a group of coupons 6, 7, 8, 9, 10, 11, 12, 13 and 14, each extending crosswise of the body portion 5 and each bearing on its face value-limiting indicia. The coupons of each group are arranged in graduated order from the smallest to the highest amounts indicated; and it will further be observed that the coupons of one group are arranged in the inverse order of those of the other group relatively to the body portion 5 of the check.

In use, assuming that the amount of the check is twenty-five dollars or less, the drawer, with a pair of scissors, or any other suitable cutting tool, cuts off all the coupons at the left-hand end except the innermost coupon 6, leaving all of the coupons at the right-hand end. If the amount of the check is fifty dollars or less, but over twenty-five dollars, the drawer cuts off all the coupons at the left except the innermost two coupons 6 and 7, and also cuts off the outermost coupon 6 at the right-hand end. If the amount of the check is two hundred dollars or between that and one hundred and seventy-five dollars, the drawer cuts off the outermost coupon 14 at the left and all except the innermost two coupons 13 and 14 at the right. Now it will be observed that, owing to the inverse order of the coupons at the two ends relatively to the intermediate or body portion of the check, and to the fact that the coupons are of uniform width, the clipping or trimming operation reduces the total length of the check by the same amount regardless of the value to which it is cut, thus leaving the check always of a fixed or standard size. Furthermore, the value limitation in all instances appears at both extreme ends of the check, and, of course, must agree in amount.

The number of coupons employed, the values indicated thereon, and the variations in the values indicated, are, of course, all matters of choice and wholly immaterial to the invention.

As the value-limiting stamps employed by banks and other commercial establishments are quite complicated and expensive devices, it will be seen that my invention effects a considerable economy, and is fully as effective a safeguard as the stamps referred to, since the value-limiting indicia cannot be raised by cutting off one or more coupons at one end, as this would not only shorten the standard length of the check but would make the check show different value-limiting indicia at the two ends, which would make the check irregular.

While I have shown and described my invention as embodied in a bank check or draft it will be obvious that it is capable of embodiment in a money order, merchandise order, stock certificate, pay check and many other forms of paper without departing from the spirit of the invention or sacrificing any of its material advantages.

I claim:

A bank check comprising a body portion provided at each end with a plurality of separable imperforate coupons each being of the same width transversely of the check and extending across the entire width of the check, said coupons bearing graduated value-limiting indicia and the coupons at opposite ends of the check being arranged in inverse order so that when coupons are removed to leave similar indicia at each extremity of the check, said check including the attached coupons will always be of standard size, presenting regular and unbroken side and end edges.

WILLIAM H. DEWEES.

Witnesses:
JOHN S. LAIDLAW,
IRA J. WILSON.